US012645278B2

(12) United States Patent (10) Patent No.: US 12,645,278 B2
Kenarangi et al. (45) Date of Patent: Jun. 2, 2026

(54) POWER PREDICTION USING A MACHINE LEARNING MODEL

(71) Applicant: Google LLC, Mountain View, CA (US)

(72) Inventors: Farid Kenarangi, Sunnyvale, CA (US); Vinu Vijay Kumar, Belmont, CA (US); Neha Bajaj, San Diego, CA (US); Seyed Hamed Fatemi, San Jose, CA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/610,184

(22) Filed: Mar. 19, 2024

(65) Prior Publication Data

US 2025/0298454 A1 Sep. 25, 2025

(51) Int. Cl.
 *G06F 1/32* (2019.01)
 *G06F 1/3206* (2019.01)
(52) U.S. Cl.
 CPC .................................. *G06F 1/3206* (2013.01)
(58) Field of Classification Search
 CPC .................................................... G06F 1/3206
 See application file for complete search history.

(56) References Cited

U.S. PATENT DOCUMENTS

2022/0027758 A1* 1/2022 Kreshpa ............... G06N 3/0442
2023/0259189 A1* 8/2023 Rajwan .................... G06F 1/28
2023/0419984 A1* 12/2023 Uhle ...................... G10L 25/48

OTHER PUBLICATIONS

Pandey, et al., "ECO Cell IR Drop Signoff Using Machine Learning", Technical Disclosure Commons, https://www.tdcommons.org/dpubs_series/9933, Apr. 24, 2026, 11 pages.

* cited by examiner

*Primary Examiner* — Stefan Stoynov
(74) *Attorney, Agent, or Firm* — Colby Nipper PLLC

(57) ABSTRACT

Methods, systems, and apparatus, for predicting power measurements on a device using predictive models. One of the methods includes continually generating, by a power sensor of a power management system of a device, a respective measure of power consumed at each of a plurality of time points. A power prediction module receives a sequence of N power measurements consumed for N previous time points and generates a predicted power measurement at a future time point based on a trained predictive model.

20 Claims, 3 Drawing Sheets

100

| Device 130a | Device 130b | Device 130c | | Device 130d |
|---|---|---|---|---|

Power Domain 110a

Power Management Subsystem 120a

Power Manager 126a

Power Predictor 124a ◄ Power Sensor 122a

Power Domain 110b

Power Management Subsystem 120b

Power Manager 126b

Power Predictor 124b ◄ Power Sensor 122b

| Device 130e | Device 130f | | Device 130g | Device 130h | Device 130i |
|---|---|---|---|---|---|

Power Domain 110c

Power Management Subsystem 120c

Power Manager 126c

Power Predictor 124c ◄ Power Sensor 122c

Power Domain 110d

Power Management Subsystem 120d

Power Manager 126d

Power Predictor 124d ◄ Power Sensor 122d

INPUT PAST POWER INFORMATION TO A PREDICTIVE MODEL ⟋302

CALCULATE AN EXPECTED FUTURE POWER MEASUREMENT USING THE PREDICTIVE MODEL ⟋304

MAP THE CALCULATED EXPECTED FUTURE POWER TO A DVFS VALUE ⟋306

MODIFY POWER SETTINGS BASED ON THE DVFS VALUE ⟋308

POWER PREDICTION USING A MACHINE LEARNING MODEL

BACKGROUND

This specification relates to power management systems for computing devices.

A power management system can supply power to various areas of a computing device and adjust the voltage and frequencies of the areas of the computing device.

Dynamic voltage and frequency scaling (DVFS) refers to techniques for performing real-time adjustments of a device's operating voltage and frequency during runtime based on the power consumption of the device to maximize energy efficiency.

Power management systems suffer from imprecise predictions of power consumed by different areas of a computing device and slow reactions to changes in power consumption patterns.

SUMMARY

This specification describes techniques for implementing a power management system that uses a predictive model to dynamically adjust power settings for different operating contexts. The power management system can include multiple power domains that each supply power to different areas of a computing device. Each power domain can include a power management subsystem that includes a power prediction module that generates a predicted power measurement at a future time point based on a trained predictive model. The predictive model can be a neural network that processes past power measurements to generate an expected future power measurement.

The power management system described in this specification can use the expected predicted power measurements for each domain to select a dynamic voltage and frequency scaling adjustment for areas of a computing device associated with each power domain. A dynamic voltage and frequency scaling is a real-time adjustment of a device's operating voltage and frequency during runtime based on the power consumption of the device to maximize energy efficiency.

Particular embodiments of the subject matter described in this specification can be implemented so as to realize one or more of the following advantages. The power management system described in this specification allows more efficient tuning for specific use cases. There are different power consumption patterns that occur on a device based on tasks that are being run. A power management system can adjust the voltage and the frequency of a device to match the changes in power consumption. Designing a power management system to select an optimal voltage and frequency is difficult for a variety of reasons. Tuning a power management system to select standalone use cases can take many months of effort using metrics such as utilization, time-to-throttle, energy efficiency, etc. Additionally, effectively recognizing and using the tuned settings for a use case is challenging and requires receiving hints regarding a particular use case. The power management system described in this specification utilizes a predictive machine learning model to predict future power consumption. Training the machine learning model using power consumption patterns sampled from representative use cases allows the power management system to compress the amount of time spent on tuning for specific use cases. Additionally, using a predictive model allows the power management system to make voltage and frequency adjustments for a particular use case without needing to receive hints. Furthermore, using a predictive machine learning model to predict future power consumption allows the power management system to proactively set up an adjustment to voltage and frequency based on predicted usage.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a diagram of an example power management system.

Like reference numbers and designations in the various drawings indicate like elements.

DETAILED DESCRIPTION

Figure 2:
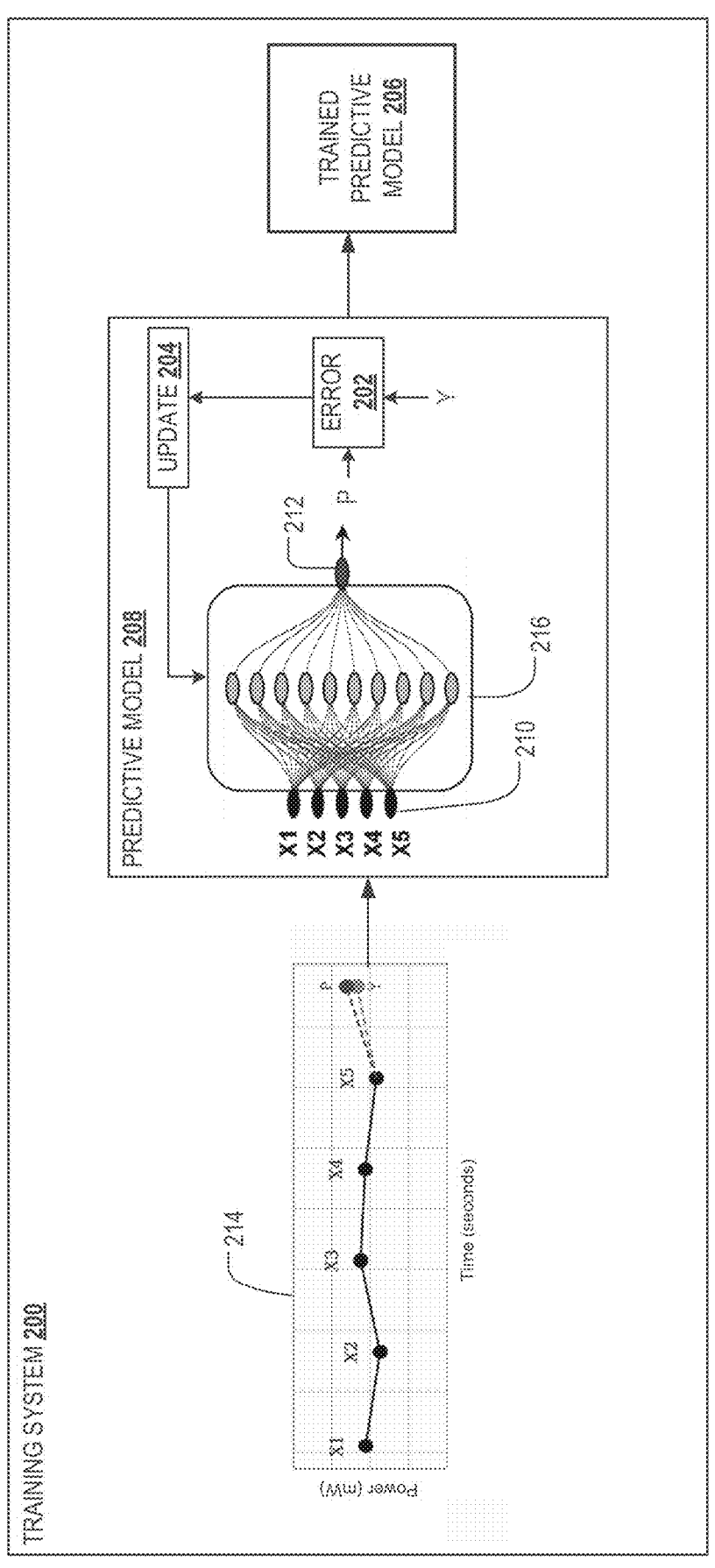
FIG. 2 shows an example training system for training a predictive model.

FIG. 1 is a diagram of an example power management system 100. The system 100 includes multiple power domains 110*a-d* and a respective separate power management subsystem 120*a-d* for each power domain. Each power management system can be configured to control power for the power domain based on a separately trained power predictive model 124*a-d* for the power domain. The system 100 as illustrated shows four power domains. A system implementation can have more or fewer power domains than those illustrated in FIG. 1. In general, the system can include any appropriate number of power domains e.g., 3, 5, 10, etc. For example, the system can have six power domains and six power management systems with separately trained predictive models.

The system 100 can be installed on or integrated into any appropriate computing device. Because the techniques described in this specification are suited to saving power consumption for the computing device, the system 100 can be particularly beneficial when installed on a mobile computing device that rely on battery power, e.g., a smart phone, a smart watch or another wearable computing device, a tablet computer, or a laptop computer, to name just a few examples. Each power domain 110*a-d* can be associated with a different area of the computing device.

Each power domain 110*a-d* in the system 100 is used to power one or more devices 130*a-i*. Each power domain 110*a-d* can be used to power any appropriate number of devices e.g., 1 device, 2 devices, 3 devices etc. As illustrated in FIG. 1, the power domain 110*a* powers three devices 130*a-c*, the power domain 110*b* powers one device 130*d*, the power domain 110*c* powers two devices 130*e-f*, and the power domain 110*d* powers three devices 130*g-i*. The devices associated with each power domain. Each power domain 110*a-d* in the system 100 has different power requirements because each power domain has different devices that operate differently under different conditions.

Each of the devices 130*a-i* can be any appropriate module, device, or functional component that is configured to be powered by a power domain. For example, a device can be a GPU, CPU, an application-specific integrated circuit, or lower-level components of the computing device. The devices can be, for example, a camera module, a speaker module, etc. The conditions can be determined by a use case of the computing device. The use cases can include, for example, a variety of gaming use cases, a camera use case, a video playing use case, etc. Each use case can have different power requirements from each device 130a-i.

Each power management subsystem 120 a-d includes a respective power sensor 122a-d, power predictor 124a-d, and power manager 126a-d.

Each power sensor 122a-d is configured to continually generate a respective measure of power consumed at each of multiple time points. A power sensor 122a-d can be, for example, a multipath sensor, a wideband sensor, an average power sensor, or a thermal sensor. The measure of power can be, for example, a number representing the milliwatts of power consumed at a particular time point. Each power sensor 122a-d can generate the measure of power for any appropriate number of time points (e.g., 5, 10, 15, 100 etc.) at any appropriate time intervals (e.g., once every 20 milliseconds, once every 30 milliseconds, etc.).

Each power predictor 124a-d predicts a measure of power at a future time point based on the measures of power generated by the respective power sensor 122a-d in the respective power management subsystem 120a-d. The predicted measure of power at a future time point can indicate an expected amount of power to be consumed at the future time point.

Each power predictor 124a-d can be a power prediction module that is configured to receive a sequence of N most-recent power measurements consumed for N previous time points and to generate a predicted power measurement at a future time point based on a trained predictive model. N can be any appropriate nonzero positive integer e.g., 1, 3, 5, 10, etc. Each power prediction module is small enough to be implemented in logic circuitry. This allows the power prediction module to be fast enough to be used for real-time applications. Each power predictor can obtain the N most-recent power measurements from a small register file that records the N most recently used power-readings. In some examples, the registers in the register file can be shift registers that shift their values to the next register in the file in order to efficiently track the N most recently used power readings.

Each predictive model can be trained for the characteristics of its respective power domain 110a-d. Each predictive model can be any appropriate machine learning model that is configured to generate a predicted power measurement, e.g., a neural network model.

As a particular example, a predictive model can be a neural network that has an intermediate layer that includes multiple intermediate nodes. Each intermediate node can take in an input, apply one or more weights with an activation function, and generate an output. The intermediate nodes can be fully connected to input nodes corresponding to each of the N most-recent measures of power generated by the respective power sensor 122a-d. The intermediate nodes can connect to a single output node that receives inputs from each of the multiple intermediate nodes and generates a predicted future measure of power.

Each power predictor 124a-d can have a register file that stores the weights of the intermediate nodes. The weights can be generated by computer software, e.g., in a data center, The computing device can be configured with the weights, either during manufacture or downloaded to the device. Alternatively or in addition, the weights can be dynamically updated as the computing device is operating.

Training a predictive model is described in further detail below with reference to FIG. 2.

Each power predictor 124a-d can feed the predictions of future measures of power into the respective power manager 126a-d in the respective power management subsystem 120a-d. Each power manager 126a-d uses the predictions of future measures of power to supply power to the devices 130a-i in the respective power domain 110a-d. For example, a power manager 126a-d can supply the devices 130a-i in the respective power domain 110a-d with the amount of power indicated by the predicted future measure of power. As a particular example, if a predicted future measure of power for a power domain 110b is 1200 milliwatts, the respective power manager 126b can supply the device 130d with 1200 milliwatts of power.

FIG. 2 illustrates the architecture of an example predictive model 206. The predictive model can be a part of a power prediction module e.g., any of the power predictors 124a-d of FIG. 1. The predictive model can be trained using an offline training process that uses training data derived from a series of measures of power.

A training system 200 can train a predictive model for a particular power domain of a system that has multiple power domains. For example, if a system has five power domains, each power domain can include a respective power management system that controls power for the power domain based on a separately trained predictive model. The training system can train five separate predictive models, each corresponding to one of the five power domains.

The training environment can be a computer system of one or more computers that has collected thousands or millions of training examples from many different devices, which may or may not have the predictive model described in this specification. The training system can receive rich training data for many different operating contexts for each power domain. Each predictive model is then trained by the computer system, resulting in a set of weights that will be used for the predictive model on the computing device.

The training data includes past power measurements. The training data can include a collection of training examples 214. Each training example 214 can include multiple power measurements X1, X2, X3, X4, and X5 and a corresponding actual future power measurement Y. Each power measurement can be a numerical value that indicates the amount of power consumed by devices that are powered by a power management subsystem in milliwatts at the corresponding time point. The training example 214 shows the five most recent power measurements X1, X2, X3, X4, and X5, but each training example can include any appropriate number of most recent power measurements e.g., 4, 6, 9, 15, etc. The power measurements X1, X2, X3, X4, and X5 and Y can be collected at any appropriate time intervals e.g., once every 20 milliseconds, once every 30 milliseconds, etc.

The predictive model 208 processes each training example 214 to generate a predicted future power P. The predictive model 208 can be any appropriate machine learning model that is configured to generate a predicted power measurement, e.g., a neural network model.

As a particular example, the predictive model 208 can be a neural network that has an intermediate layer that includes multiple intermediate nodes 216. The intermediate nodes 216 can be fully connected to input nodes 210 corresponding to each of the most-recent measures of power X1, X2, X3, X4, and X5. The intermediate nodes 214 can connect to a single output node 212 that receives inputs from each of the multiple intermediate nodes and generates a predicted future power measurement P. The predictive model can include any appropriate number of intermediate nodes e.g., 5, 15, 25, 100, etc.

Each intermediate node 216 can have a respective set of one or more weights and one or more computational operations to be performed between the one or more weights and input values received from the input nodes 210. For each training example, the training system 200 can calculate an update 204 to the weights of the intermediate nodes 216 based on an error 202 between the predicted future power P for the training example and the actual future power Y. The error can be any appropriate measure of difference between the predicted future power P and the actual future power Y, e.g., a mean squared error.

The training system 200 trains the predictive model 208 to optimize an objective function that minimizes the error 202 between the predicted future power P and the actual future power Y. In some examples, the training system can continue to train the predictive model 208 for a predetermined number of training iterations e.g., 1000, 10000, 20000 etc. In other examples, the training system can continue to train the predictive model 208 until the predictive model reaches a predetermined performance threshold. e.g., a mean squared error of 0.0001. In some examples, the training system can minimize the error by using a backpropagation with gradient descent technique.

Once training is complete, the training system can return a trained predictive model 206. The trained predictive model 206 can be used in a power predictor of a power management subsystem to generate a future amount of power to be supplied to one or more devices. The power predictor can have a register file that stores the weights of the intermediate nodes. The weights can be generated by computer software, e.g., in a data center, The computing device can be configured with the weights, either during manufacture or downloaded to the device. Alternatively or in addition, the weights can be dynamically updated as the computing device is operating.

Figure 3:
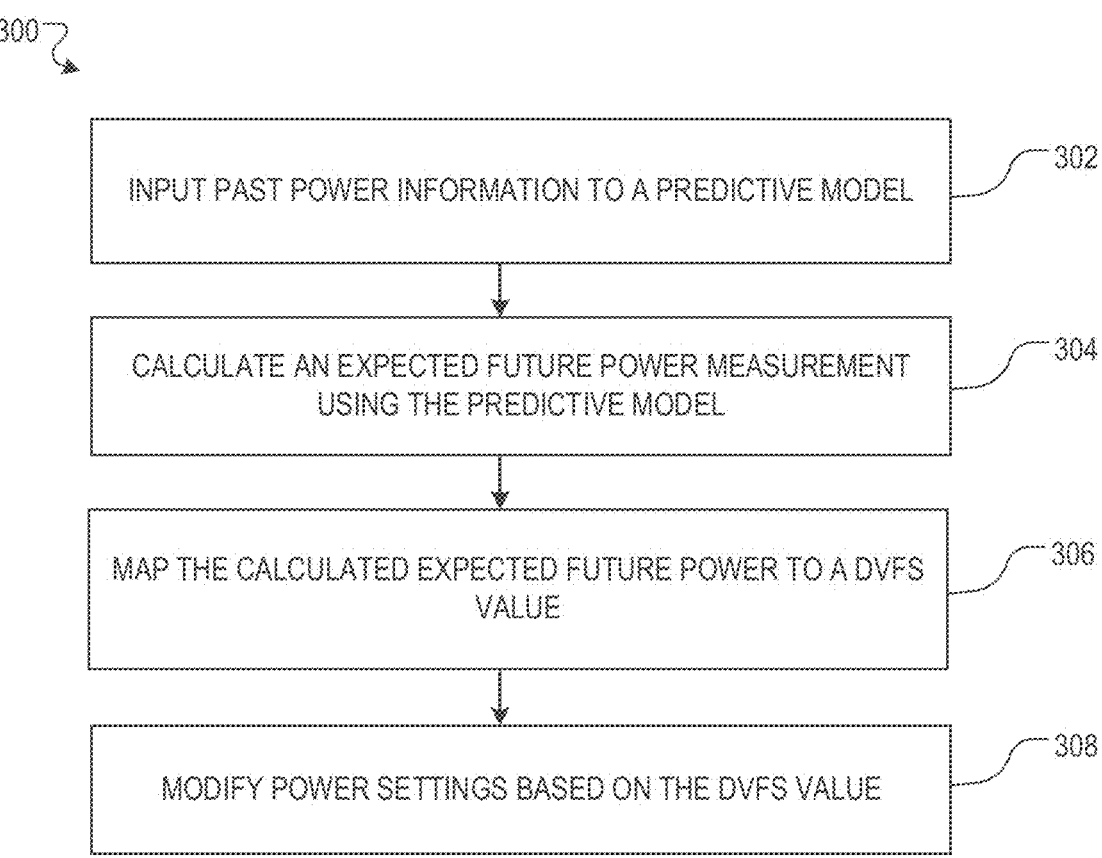
FIG. 3 is a flowchart of an example process for selecting a dynamic voltage and frequency scaling.

The training system can train the predictive model 208 for particular application types. In some examples, the one or more weights of each intermediate node can have values generated from a training process for a particular application type. The particular application type can be any appropriate use case for a computing device e.g., a gaming use case, a camera use case, etc. The training system can generate weight values for multiple application types based on a collection of training examples for each of multiple application types. Each training example can have multiple power measurements for the particular application type. FIG. 3 is a flowchart of an example process for selecting a dynamic voltage and frequency scaling. The example process can be performed by one or more components of a power management subsystem. The example process will be described as being performed by a power management system e.g., the power management subsystem 120a of FIG. 1, programmed appropriately in accordance with this specification.

The system inputs past power information into a predictive model (302). The system uses a power sensor to generate the past power information.

The power sensor continually generates a respective measure of power consumed at each of multiple time points. The measure of power can be, for example, a number representing the milliwatts of power consumed at a particular time point. The power sensor can generate the measure of power for any appropriate number of time points (e.g., 5, 10, 15, 100 etc.) at any appropriate time intervals (e.g., once every 20 milliseconds, once every 30 milliseconds, etc.).

The system can provide the predictive model with N most-recent power measurements consumed for N previous time points. N can be any appropriate nonzero positive integer e.g., 1, 3, 5, 10, etc.

The system calculates an expected future power measurement using the predictive model (304).

The predictive model can process the N most-recent power measurements consumed for N previous time points to generate a predicted power measurement at a future time point. The predictive model can be any appropriate machine learning model that is configured to generate a predicted power measurement, e.g., a neural network model.

As a particular example, the predictive model can be a neural network that has an intermediate layer that includes multiple intermediate nodes. The intermediate nodes can be fully connected to input nodes corresponding to each of the N most-recent measures of power generated by the respective power sensor. The intermediate nodes can connect to a single output node that receives inputs from each of the multiple intermediate nodes and generates an expected future measure of power. The expected future measure of power can be a numerical value that measures the amount of power predicted to be consumed at a future time point in milliwatts.

The system maps the calculated expected future power measurement to a DVFS value (306). The system can use a policy that maps power values, e.g., represented in milliwatts, to a desired DVFS value, e.g., a desired frequency level, e.g., in Megahertz, a desired voltage level, or both. For example, the system can compute a desired frequency level that represents the optimal frequency that a processor or device can be set to in order to minimize energy consumption while meeting required performance. The system can for example use a precomputed table that maps predicted power measurements to DVFS values.

The system modifies its power settings based on the DVFS value (308). The system can for example select the mapped frequency, voltage, or both to perform dynamic voltage and frequency scaling based on the mapping of the predicted future power.

The system can select the upcoming dynamic voltage and frequency scaling as the desired frequency value mapped for the expected future power. Dynamic voltage and frequency scaling involves adjusting of a device's operating voltage and frequency during runtime based on power consumption of the device. Dynamic voltage and frequency scaling based on predicted power measurements allows a device to maintain the voltage of a device at level required to maintain the required performance of a current task while consuming less energy. For example, if a current task is computationally intensive, the dynamic voltage and frequency scaling adjustment increases the voltage and frequency to match the increased power consumption. However, when a current task is less computationally expensive, the dynamic voltage and frequency scaling adjustment decreases the voltage and frequency to match the decreased power consumption. The voltage and frequency are set together.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a hardware-implemented or software implemented input/output system that provides an output that is different from the input. An engine can be implemented in dedicated digital circuitry or as computer-readable instructions to be executed by a computing device. Each engine can be implemented within any appropriate type of computing device, e.g., servers, mobile phones, tablet computers, notebook computers, music players, e-book readers, laptop or desktop computers, PDAs, smart phones, or other stationary or portable devices, that includes one or more processing modules and computer-readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a host device having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a system comprising:

a power management system comprising:

a power sensor configured to continually generate a respective measure of power consumed at each of a plurality of time points, and a power prediction module configured to receive a sequence of N power measurements consumed for N previous time points and to generate a predicted power measurement at a future time point based on a trained predictive model.

Embodiment 2 is the system of embodiment 1, wherein the predictive model is a neural network having an intermediate layer comprising a plurality of intermediate nodes that are fully connected to input nodes corresponding to each of the N most-recent power measurements.

Embodiment 3 is the system of embodiment 2, wherein the predictive model has a single output node that receives inputs from each of the plurality of intermediate nodes and generates a predicted future power measurement.

Embodiment 4 is the system of any one of embodiments 1-4, wherein the system has a plurality of power domains and wherein each power domain comprises a respective power management system configured to control power for the power domain based on a separately trained predictive model for the power domain.

Embodiment 5 is the system of embodiment 4, wherein the system has more than five power management systems with separately trained predictive models.

Embodiment 6 is the system of any one of embodiments 1-5, wherein each intermediate node has a respective set of one or more weights and one or more computational operations to be performed between the one or more weights and input values received from the input nodes.

Embodiment 7 is the system of embodiment 6, wherein the one or more weights of each intermediate node have values generated from a training process for a particular application type.

Embodiment 8 is the system of embodiment 7, wherein the weight values generated by the training process are based on a collection of training examples, each example having a plurality of power measurements for the particular application type and a corresponding power level.

Embodiment 9 is the system of any one of embodiments 1-8, wherein the power management system is configured to modify power settings of the system according to the predicted power measurement.

Embodiment 10 is the system of embodiment 9, wherein modifying the power settings comprises setting a voltage value, a frequency value, or both.

Embodiment 11 is a method comprising:

continually generating, by a power sensor of a power management system of a device, a respective measure of power consumed at each of a plurality of time points; and receiving, by a power prediction module, a sequence of N power measurements consumed for N previous time points; and generating, by the power prediction module, a predicted power measurement at a future time point based on a trained predictive model.

Embodiment 12 is the method of embodiment 11, wherein the predictive model is a neural network having an intermediate layer comprising a plurality of intermediate nodes that are fully connected to input nodes corresponding to each of the N most-recent power measurements.

Embodiment 13 is the method of embodiment 12, wherein the predictive model has a single output node that receives inputs from each of the plurality of intermediate nodes and generates a predicted future power measurement.

Embodiment 14 is the method of any one of embodiments 11-13, wherein the system has a plurality of power domains and wherein each power domain comprises a respective power management system configured to control power for the power domain based on a separately trained predictive model for the power domain.

Embodiment 15 is the method of embodiment 14, wherein the system has more than five power management systems with separately trained predictive models.

Embodiment 16 is the method of any one of embodiments 11-15, wherein each intermediate node has a respective set of one or more weights and one or more computational operations to be performed between the one or more weights and input values received from the input nodes.

Embodiment 17 is the method of embodiment 16, wherein the one or more weights of each intermediate node have values generated from a training process for a particular application type.

Embodiment 18 is the method of embodiment 17, wherein the weight values generated by the training process are based on a collection of training examples, each example having a plurality of power measurements for the particular application type and a corresponding power level.

Embodiment 19 is the method of any one of embodiments 11-18, further comprising modifying, by the power management system, power settings of the system according to the predicted power measurement.

Embodiment 20 is the method of embodiment 19, wherein modifying the power settings comprises setting a voltage value, a frequency value, or both.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
a plurality of power domains; and
a power management subsystem integrated within each power domain of the plurality of power domains, the power management subsystem comprising:
    a power sensor configured to generate a measure of power consumed at each of a plurality of time points;
    logic circuitry configured to:
        receive a sequence of N power measurements generated by the power sensor, the N power measurements corresponding to N previous time points from the plurality of time points;
        obtain a set of weights for a trained predictive model from a register file; and
        apply the set of weights to the sequence of N power measurements to generate a predicted power measurement at a future time point; and
    a power manager configured to proactively modify hardware power settings before the future time point occurs by mapping the predicted power measurement to a dynamic voltage and frequency scaling (DVFS) value.

2. The system of claim 1, wherein the trained predictive model is a neural network having an intermediate layer comprising a plurality of intermediate nodes that are fully connected to a plurality of input nodes corresponding to each of the N previous power measurements.

3. The system of claim 2, wherein the neural network has a single output node that receives inputs from each of the plurality of intermediate nodes and generates the predicted power measurement.

4. The system of claim 2, wherein each of the plurality of intermediate nodes has a respective set of one or more weights and one or more computational operations to be performed between the one or more weights and input values received from the plurality of input nodes.

5. The system of claim 4, wherein the one or more weights of each intermediate node have values generated from a training process for a particular application type.

6. The system of claim 5, wherein the weight values generated by the training process are based on a collection of training examples, each example having a plurality of power measurements for the particular application type and a corresponding power level.

7. The system of claim 1, wherein each power management subsystem is configured to control power for the power domain based on a separately trained predictive model tailored to the functional characteristics of devices within that power domain.

8. The system of claim 7, wherein the system has more than five power management subsystems with separately trained predictive models.

9. The system of claim 1, wherein the power manager utilizes a policy that maps power values to frequency levels and voltage levels to modify the hardware power settings.

10. The system of claim 1, wherein modifying the hardware power settings comprises setting a voltage value, a frequency value, or both.

11. A method comprising:
generating, by a power sensor of a power management system of a power domain of a device, a measure of power consumed at each of a plurality of time points;
receiving, by logic circuitry, a sequence of N power measurements consisting of N of the generated measures of power consumed for N previous time points;
generating, by the logic circuitry, a predicted power measurement for a future time point by applying, based on a trained predictive model, a set of weights obtained from a register file to the sequence of N power measurements;
mapping the predicted power measurement to a dynamic voltage and frequency scaling (DVFS) value; and
proactively scaling the power domain to the DVFS value before the future time point occurs.

12. The method of claim 11, wherein the predictive model is a neural network having an intermediate layer comprising a plurality of intermediate nodes that are fully connected to a plurality of input nodes corresponding to each of the N power measurements.

13. The method of claim 12, wherein the neural network has a single output node that receives inputs from each of the plurality of intermediate nodes and generates the predicted power measurement for the future time point.

14. The method of claim 12, wherein each of the plurality of intermediate nodes has a respective set of one or more weights and one or more computational operations to be performed between the one or more weights and input values received from the plurality of input nodes.

15. The method of claim 14, wherein the one or more weights of each intermediate node have values generated from a training process for a particular application type.

16. The method of claim 15, wherein the weight values generated by the training process are based on a collection of training examples, each example having a plurality of power measurements for the particular application type and a corresponding power level.

17. The method of claim 11, wherein the device has a plurality of power domains and wherein each power domain comprises a respective power management subsystem configured to control power for the power domain based on a separately trained predictive model for the power domain.

18. The method of claim 17, wherein the system has more than five power management subsystems with separately trained predictive models.

19. The method of claim 11, wherein the proactively scaling the power domain comprises modifying, by the power management system, power settings of the device according to the predicted power measurement.

20. The method of claim 19, wherein modifying the power settings comprises setting a voltage value, a frequency value, or both.

* * * * *